United States Patent
Li et al.

(10) Patent No.: US 11,604,843 B2
(45) Date of Patent: Mar. 14, 2023

(54) METHOD AND SYSTEM FOR GENERATING PHRASE BLACKLIST TO PREVENT CERTAIN CONTENT FROM APPEARING IN A SEARCH RESULT IN RESPONSE TO SEARCH QUERIES

(71) Applicants: Baidu USA LLC, Sunnyvale, CA (US); Baidu.com Times Technology (Beijing) Co., Ltd., Beijing (CN)

(72) Inventors: Dong Li, Sunnyvale, CA (US); Lei Ma, Sunnyvale, CA (US); Guang Yang, San Jose, CA (US); Deping Xie, Beijing (CN)

(73) Assignees: BAIDU USA LLC, Sunnyvale, CA (US); BAIDU.COM TIMES TECHNOLOGY (BEIJING) CO., LTD., Beijing (CN)

( * ) Notice: Subject to any disclaimer, the term of this patent is extended or adjusted under 35 U.S.C. 154(b) by 950 days.

(21) Appl. No.: 15/125,811

(22) PCT Filed: Sep. 2, 2016

(86) PCT No.: PCT/CN2016/097880
§ 371 (c)(1),
(2) Date: Sep. 13, 2016

(87) PCT Pub. No.: WO2018/040062
PCT Pub. Date: Mar. 8, 2018

(65) Prior Publication Data
US 2018/0218079 A1  Aug. 2, 2018

(51) Int. Cl.
*G06F 16/9535* (2019.01)
*G06F 16/335* (2019.01)
(Continued)

(52) U.S. Cl.
CPC ........ *G06F 16/9535* (2019.01); *G06F 16/313* (2019.01); *G06F 16/335* (2019.01); *G06F 40/242* (2020.01); *G06F 40/289* (2020.01)

(58) Field of Classification Search
CPC .. G06F 16/9535; G06F 16/313; G06F 16/335; G06F 17/2735; G06F 17/2775
See application file for complete search history.

(56) References Cited

U.S. PATENT DOCUMENTS 6,470,307 B1 * 10/2002 Turney .................... G06F 16/30
704/9
9,356,919 B1 * 5/2016 Yakoel .................... H04L 63/08
(Continued)

FOREIGN PATENT DOCUMENTS

CN   201550138 U  *  8/2010
CN   101836208 A      9/2010
(Continued)

*Primary Examiner* — Ashish Thomas
*Assistant Examiner* — Abdullah A Daud
(74) *Attorney, Agent, or Firm* — Womble Bond Dickinson (US) LLP

(57) ABSTRACT

According to one embodiment, a first phrase having one or more keywords is received to be added to a phrase blacklist, where the first phrase has been determined to be related to unwanted content. An analysis is performed on the keywords of the first phrase to identifying a set of one or more related phrases that are related to the first phrase. The first phrase and the set of related phrases are added in the phrase blacklist. The phrase blacklist contains a plurality of phrases that have been determined to be related to unwanted content. The phrase blacklist is utilized to prevent a content item from appearing in a search result, in response to a search query having a phrase matching at least one of the phrases in the phrase backlist.

15 Claims, 8 Drawing Sheets

(51) Int. Cl.
  *G06F 16/31* (2019.01)
  *G06F 40/242* (2020.01)
  *G06F 40/289* (2020.01)

(56) References Cited

U.S. PATENT DOCUMENTS

| | | | | |
|---|---|---|---|---|
| 9,594,741 | B1* | 3/2017 | Thakurta | G06F 17/16 |
| 9,705,966 | B1* | 7/2017 | Cherukuri | H04L 67/10 |
| 9,727,906 | B1* | 8/2017 | Sarmento | G06Q 30/0631 |
| 2007/0288448 | A1* | 12/2007 | Datta | G06F 16/3338 |
| | | | | 707/999.005 |
| 2008/0228761 | A1* | 9/2008 | Kei Leung | G06F 16/90 |
| | | | | 707/999.005 |
| 2009/0063452 | A1* | 3/2009 | Ahn | G06F 16/735 |
| | | | | 707/999.005 |
| 2009/0204677 | A1* | 8/2009 | Michaelis | G06F 16/9535 |
| | | | | 709/206 |
| 2011/0106721 | A1* | 5/2011 | Nickerson | G06F 3/0484 |
| | | | | 715/764 |
| 2012/0143965 | A1* | 6/2012 | Parker | G06Q 10/00 |
| | | | | 709/206 |
| 2013/0238600 | A1* | 9/2013 | Kindler | G06F 21/552 |
| | | | | 707/722 |
| 2013/0304818 | A1* | 11/2013 | Brumleve | G06Q 50/01 |
| | | | | 709/204 |
| 2014/0229154 | A1* | 8/2014 | Leydon | H04L 51/063 |
| | | | | 704/2 |
| 2014/0258002 | A1* | 9/2014 | Zimmerman | G06Q 30/0256 |
| | | | | 705/14.72 |
| 2015/0371278 | A1* | 12/2015 | Soni | G06Q 50/01 |
| | | | | 705/14.66 |
| 2016/0088063 | A1* | 3/2016 | Cahn | H04W 4/21 |
| | | | | 715/751 |
| 2016/0092557 | A1* | 3/2016 | Stojanovic | G06F 16/248 |
| | | | | 707/723 |
| 2016/0203238 | A1* | 7/2016 | Cherniavskii | G06F 16/3322 |
| | | | | 707/722 |
| 2016/0253428 | A1 | 9/2016 | Hasan | |
| 2016/0261627 | A1* | 9/2016 | Lin | H04L 63/1441 |
| 2017/0046719 | A1* | 2/2017 | Kulchytskyy | G06Q 50/01 |
| 2017/0147682 | A1* | 5/2017 | Alaqeeli | G06F 40/194 |
| 2017/0243162 | A1* | 8/2017 | Gavrielides | G06F 16/273 |
| 2017/0249389 | A1* | 8/2017 | Brovinsky | G06F 16/24578 |
| 2017/0353463 | A1* | 12/2017 | Wu | G06F 21/6218 |
| 2018/0014066 | A1* | 1/2018 | Berman | H04N 21/439 |
| 2018/0084013 | A1* | 3/2018 | Dalton | H04L 63/308 |

FOREIGN PATENT DOCUMENTS

| | | | |
|---|---|---|---|
| CN | 102855320 | A | 1/2013 |
| CN | 103092956 | A | 5/2013 |
| CN | 103324722 | A | 9/2013 |
| JP | H1174972 | A * | 3/1999 |
| WO | 2009029825 | A1 | 3/2009 |

* cited by examiner

METHOD AND SYSTEM FOR GENERATING PHRASE BLACKLIST TO PREVENT CERTAIN CONTENT FROM APPEARING IN A SEARCH RESULT IN RESPONSE TO SEARCH QUERIES

RELATED APPLICATIONS

This application is a U.S. national phase application claiming the priority of PCT application No. PCT/CN2016/097880, filed Sep. 2, 2016, which is incorporated by reference in its entirety.

TECHNICAL FIELD

Embodiments of the invention relate generally to searching content. More particularly, embodiments of the invention relate to generating a phrase blacklist to prevent certain content from appearing in a search result in response to the search queries.

BACKGROUND

Most search engines typically perform searching of Web pages during their operation from a browser running on a client device. A search engine receives a search term entered by a user and retrieves a search result list of Web pages associated with the search term. The search engine displays the search results as a series of subsets of a search list based on certain criteria. General criteria that is used during a search operation is whether the search term appears fully or partly on a given webpage, the number of times the search string appears in the search result, alphabetical order, etc. Further, the user can decide to open a link by clicking on the mouse button to open and browse. Some of the user interactions with the search results and/or user information may be monitored and collected by the search engine to provide better searches subsequently.

Typically, in response to a search query, a search is performed to identify and retrieve a list of content items. The content items are then returned to a search requester. Some of the content may be malicious or unwanted content provided by malicious content providers. In order to prevent such malicious content to be part of a search result, certain search queries may be manually blocked to retrieve the malicious content. However, such a manual process is tedious and inefficient.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1A:
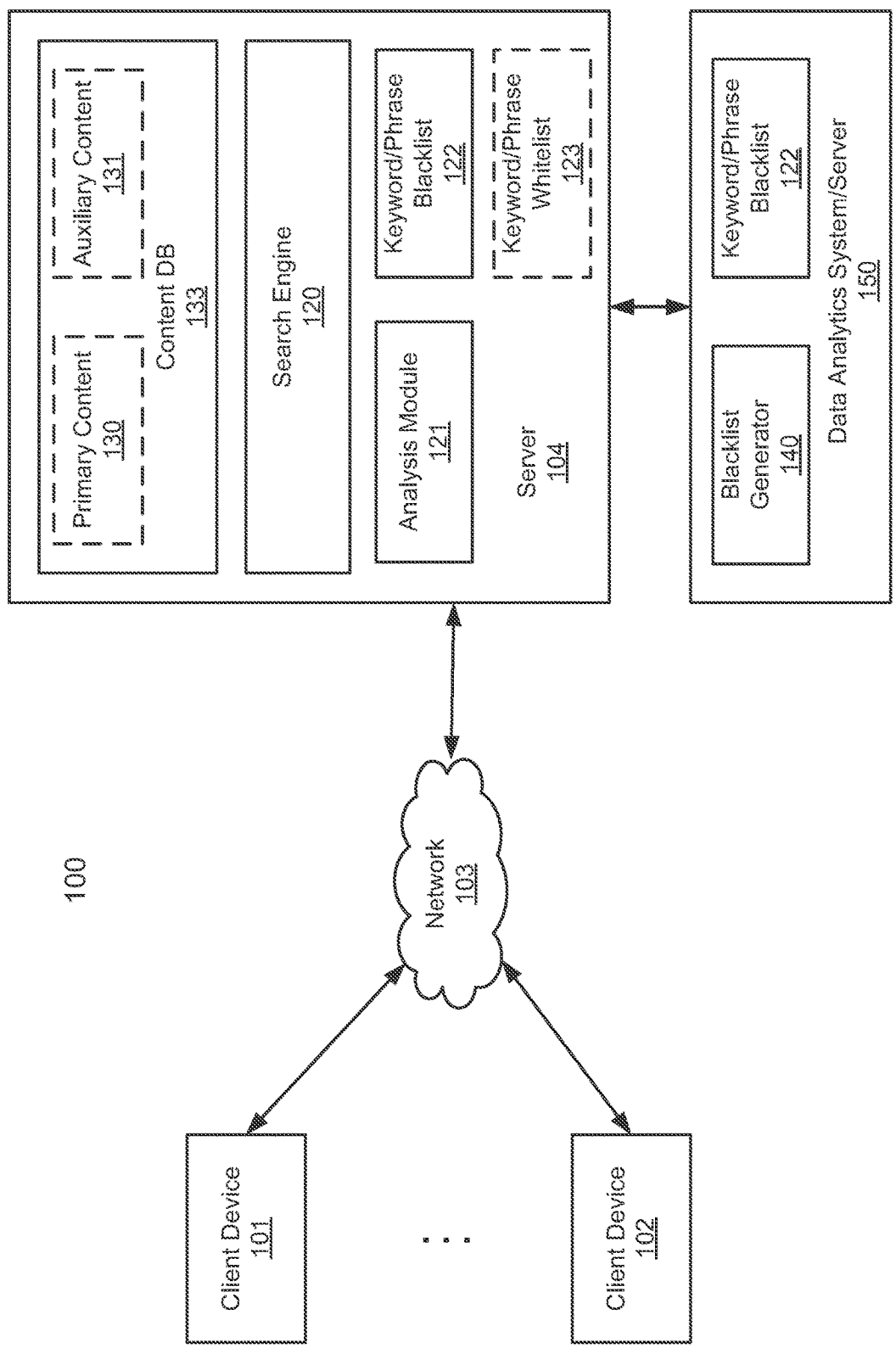
FIGS. 1A and 1B are block diagrams illustrating an example of system configuration for matching images with content items according to some embodiments of the invention.

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, when a particular keyword or phrase has been determined related to malicious or unwanted content, an analysis is performed on the keyword or phrase to generate a set of one or more similar or related keywords or phrases that are similar to or related to the original keyword or phrase. The original keyword/phrase and the related keywords/phrases are then added to a black list. Subsequently, when a search query is received for searching content, one or more keywords or phrase are extracted from the search query and compared with the keywords/phrases in the black list. If there is at least one keyword or phrase associated with the search query matches at least one keyword/phrase in the black list, the search query is blocked. Otherwise, a search is performed in a content database and a search result is generated and returned to the client.

In one embodiment, when a first phrase having one or more keywords is received to be added to a phrase blacklist, an analysis is performed on the keywords of the first phrase to derive a set of one or more related phrases that are related to the first phrase. The first phrase has been determined to be related to malicious or unwanted content. The first phrase and the set of related phrases are then added to the phrase black list. The phrase backlist contains a number of phrases that have been determined to be related to malicious or unwanted content. The phrase blacklist is utilized to block certain search queries to prevent content item from appearing in a search result, in response to a search query having a phrase matching at least one of the phrases in the phrase blacklist.

Subsequently, when a first search query is received for searching content, an analysis is performed on the keywords of the first search query to determine a second phrase. A lookup operation is performed on in the phrase blacklist based on the second phrase to determine whether the phrase blacklist contains the second phrase. If the second phrase does not exist in the phrase blacklist, a search is performed in a content database to identify a list of one or more content items. At least a portion of the content items is transmitted to the client as part of a search result. If the second phrase is found in the phrase blacklist, the first search query is blocked and no search is performed in the content database. Alternatively, a warning message may be sent to the client or an administrator.

Figure 1B:
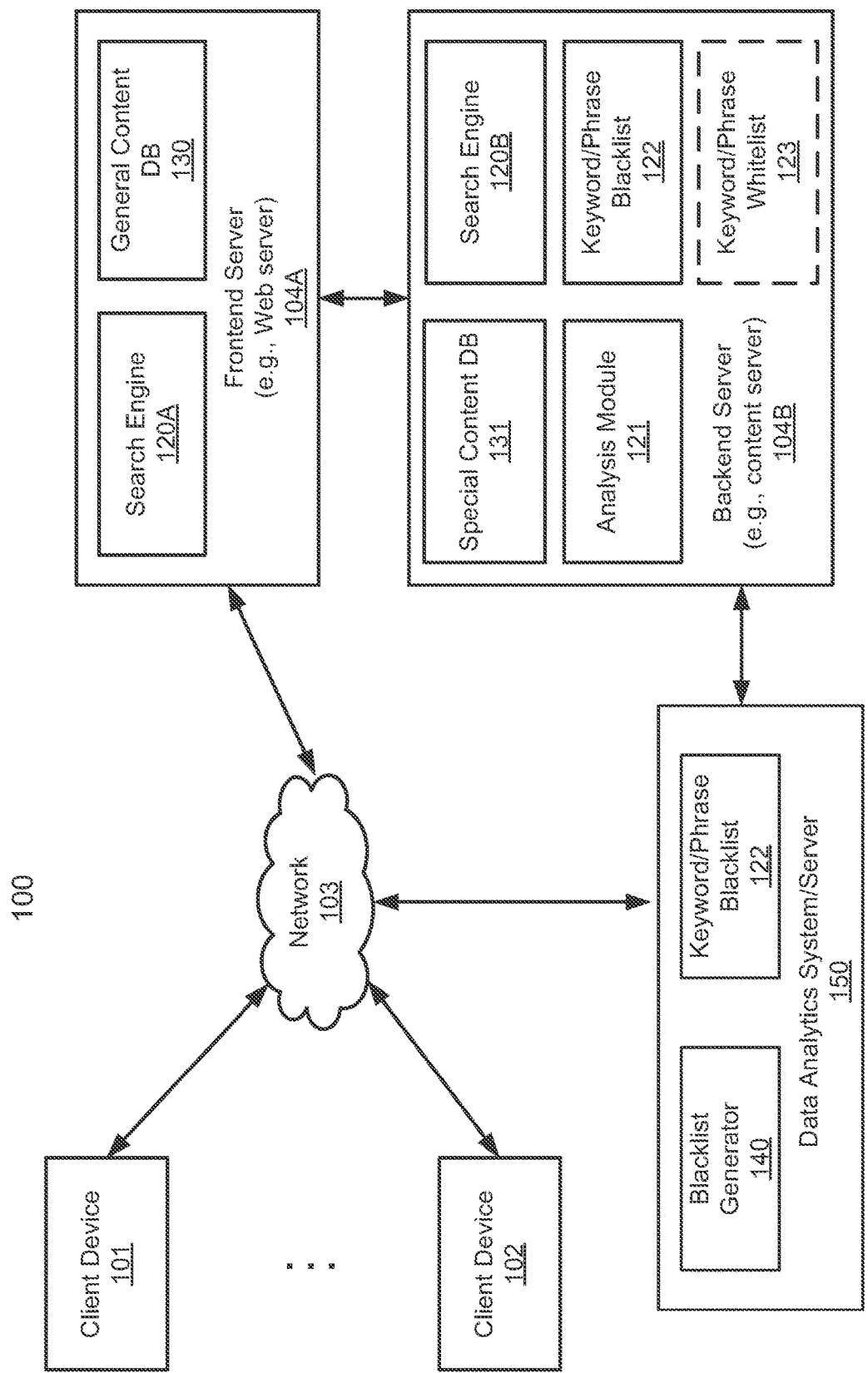

FIGS. 1A and 1B are block diagrams illustrating an example of system configuration for matching images with content items according to some embodiments of the invention. Referring to FIG. 1A, system 100 includes, but is not limited to, one or more client devices 101-102 communicatively coupled to server 104 over network 103. Client devices 101-102 may be any type of client devices such as a personal computer (e.g., desktops, laptops, and tablets), a "thin" client, a personal digital assistant (PDA), a Web enabled appliance, a Smartwatch, or a mobile phone (e.g., Smartphone), etc. Network 103 may be any type of networks such as a local area network (LAN), a wide area network (WAN) such as the Internet, or a combination thereof, wired or wireless.

Server 104 may be any kind of servers or a cluster of servers, such as Web or cloud servers, application servers, backend servers, or a combination thereof. In one embodiment, server 104 includes, but is not limited to, search engine 120 for searching content stored in content database 133, analysis module 121, and a phrase black list 122 (also simply referred to as a blacklist). The content to be searched can also be from a local module/database within an application, a software bundle, or anything that conforms to client-server/request-response relationship. Server 104 further includes an interface (not shown) to allow a client such as client devices 101-102 to access resources or services provided by server 104. The interface may include a Web interface, an application programming interface (API), and/or a command line interface (CLI).

For example, a client, in this example, a user application of client device 101 (e.g., Web browser, mobile application), may send a search query to server 104 and the search query is received by search engine 120 via the interface over network 103. In response to the search query, search engine 120 extracts one or more keywords (also referred to as search terms) from the search query. Search engine 120 performs a search in content database 133, which may include primary content database 130 and/or auxiliary content database 131, to identify a list of content items that are related to the keywords. Primary content database 130 (also referred to as a master content database) may be a general content database, while auxiliary content database 131 (also referred to as a secondary or accessory content database) may be a special content database. Search engine 120 returns a search result page having at least some of the content items in the list to client device 101 to be presented therein. Search engine 120 may be a Baidu® search engine available from Baidu, Inc. or alternatively, search engine 120 may represent a Google® search engine, a Microsoft Bing™ search engine, a Yahoo® search engine, or some other search engines. In another embodiment, search engine 120 can represent any information retrieval mechanism, and the search performed by search engine 120 can also be document, sound, image, or video, or content hash based search, online or offline.

A search engine, such as a Web search engine, is a software system that is designed to search for information on the World Wide Web. The search results are generally presented in a line of results often referred to as search engine results pages. The information may be a mix of Web pages, images, and other types of files. Some search engines also mine data available in databases or open directories. Unlike web directories, which are maintained only by human editors, search engines also maintain real-time information by running an algorithm on a web crawler.

Web search engines work by storing information about many web pages, which they retrieve from the hypertext markup language (HTML) markup of the pages. These pages are retrieved by a Web crawler, which is an automated Web crawler which follows every link on the site. The search engine then analyzes the contents of each page to determine how it should be indexed (for example, words can be extracted from the titles, page content, headings, or special fields called meta tags). Data about web pages are stored in an index database for use in later queries. The index helps find information relating to the query as quickly as possible. Alternatively, a search index can be a search index of any information, such as documents, media files, hashes, etc., which is constructed by means other than a web crawler, such as, but not limited to, a file hash indexer.

When a user enters a query into a search engine (typically by using keywords), the engine examines its index and provides a listing of best-matching web pages according to its criteria, usually with a short summary containing the document's title and sometimes parts of the text. The index is built from the information stored with the data and the method by which the information is indexed. The search engine looks for the words or phrases exactly as entered. Some search engines provide an advanced feature called proximity search, which allows users to define the distance between keywords. There is also concept-based searching where the research involves using statistical analysis on pages containing the words or phrases you search for. As well, natural language queries allow the user to type a question in the same form one would ask it to a human.

Referring back to FIG. 1A, according to one embodiment, in response to a search query received at server 104 from a client device, in this example, client device 101, search engine 120 performs a search in content database 133, such as primary content database 130 and/or auxiliary content database 131, to generate a list of content items. Each of the content items may be associated with a particular Web page of a particular Web site of a particular content provider via a uniform resource link (URL) and/or a uniform resource identifier (URI). In one embodiment, primary content database 130 stores general content items that have been collected by network crawlers (e.g., unsponsored content).

Network crawlers or Web crawlers are programs that automatically traverse the network's hypertext structure. In practice, the network crawlers may run on separate computers or servers, each of which is configured to execute one or more processes or threads that download documents from URLs. The network crawlers receive the assigned URLs and download the documents at those URLs. The network crawlers may also retrieve documents that are referenced by the retrieved documents to be processed by a content processing system (not shown) and/or search engine 120. Network crawlers can use various protocols to download pages associated with URLs, such as hypertext transport protocol (HTTP) and file transfer protocol (FTP).

Auxiliary content database 131 stores specific or special content items that are associated with specific, known, or predetermined content providers (e.g., sponsored content). In one embodiment, in response to a search query, a first set of keywords is determined based on the search query, where the keywords include search terms specified in the search query and keywords semantically related to the search terms. The first set of keywords are then matched with another set or sets of keywords (e.g., bidwords) associated with one or more content providers (e.g., advertisers). If there is a match, a corresponding content item or items are identified and retrieved from auxiliary content database 131. There may be a query keyword to content provider keyword matching data structure or table (not shown) for matching purposes.

According to one embodiment, in response to a search query having one or more keywords, analysis module 121 performs an analysis on the keywords of the search query to derive or determine a search phrase. Analysis module 121 may further determine one or more related phrases related to the search phrase, for example, via a latent semantic analysis. Analysis module 121 then performs a lookup operation in phrase blacklist 122 to determine whether phrase blacklist contains at least one of the phrases associated with the search query. If phrase blacklist 122 contains at least one of the phrases associated with the search query, the search query may be blocked for searching content database 133. Otherwise, search engine 120 performs a search in content database 133 to identify one or more content items. At least a portion of the content items may be returned as a part of search result to the client. As a result, certain phrases that may trigger malicious, unwanted, or inappropriate content may be blocked and the content may be prevented from appearing in a search result.

As described above, certain malicious content providers may place the malicious content available through multiple different channels or platforms. Such malicious content may be retrieved and returned to clients in response to certain search queries. By blacklisting certain known phrases and related phrases that may potentially trigger malicious content, the malicious content will be blocked to be delivered to users. By expanding a known phrase into multiple related phrases, the process of blocking malicious content can be automatically or systematically performed without tedious manual processes.

In one embodiment, phrase backlist 122 may be optionally configured and generated by backlist generator 140 of data analytics system 150, which may operate as a separate server over a network. Such a process can be performed offline to generate phrase backlist 122 and phrase backlist 122 can then be uploaded to server 104 to be utilized online. Blacklist generator 140 may perform an analysis on a variety of data provided from a variety of data sources (e.g., search log, Web sites, social communities, discussion forums).

In one embodiment, phrase whitelist 123 may be maintained to provide certain exceptions to phrase blacklist 122. Phrase whitelist 123 may include certain phrases that will trigger content searching. For example, phrase blacklist 122 may be considered as static settings of phrases, while phrase whitelist 123 may be considered as a dynamic settings of phrases. If an administrator determines that a particular phrase in phrase blacklist 122 is not really a phrase related to malicious content (e.g., receiving an instruction from a valid content provider), the administrator can add that particular phrase to phrase whitelist 123, such that the particular phrase will trigger content searching.

According to another embodiment, phrase blacklist 122 and/or whitelist 123 may be utilized when searching content in auxiliary content database 131. Searching in primary content database 130 will not be subject to or limited by phrase blacklist 122. That is, in response to a search query, a search will be always performed in primary content database 130 to obtain a list of primary content items (e.g., URLs of Web sites). However, whether a search will be performed in auxiliary content database 131 will depends on whether a phrase associated with the search query is listed in phrase blacklist 122.

Note that the configuration of server 104 has been described for the purpose of illustration only. Server 104 may be a Web server to provide a frontend search service to a variety of end user devices. Alternatively server 104 may be an application server or backend server that provides specific or special content search services to a frontend server (e.g., Web server or a general content server).

Referring now to FIG. 1B, in this embodiment, search engine 120A and primary or general content database 130 may be maintained in frontend server 104A, which may be a Web server. In response to a search query, search engine 120A of frontend sever 104A searches in general content database 130 to identify a list of general content items (e.g., a list of URLs of Web pages) based on one or more keywords of the search query. In addition, search engine 120A sends a request (together with the search query) to backend server 104B for a special content item. In response to the request, search engine 120B of server 104B searches in special content database 131 to identify a list of one or more special content items (e.g., Ads). Search engine 120B may perform a lookup operation in a content index (not shown) that maps one or more keywords (e.g., bidwords) to one or more content items provided by one or more content providers (e.g., advertisers). In one embodiment, server 104B is an Ad server.

Other architectures or configurations may also be applicable. For example, content database 130 and/or database 131 may be maintained and hosted in a separate server as a content server over a network, which may be organized and provided by the same entity or organization as of server 104A or server 104B. Alternatively, the content server may be maintained or hosted by separate entities or organizations (e.g., third-party providers), which are responsible for collecting contents in content databases 130-131.

Figure 2:
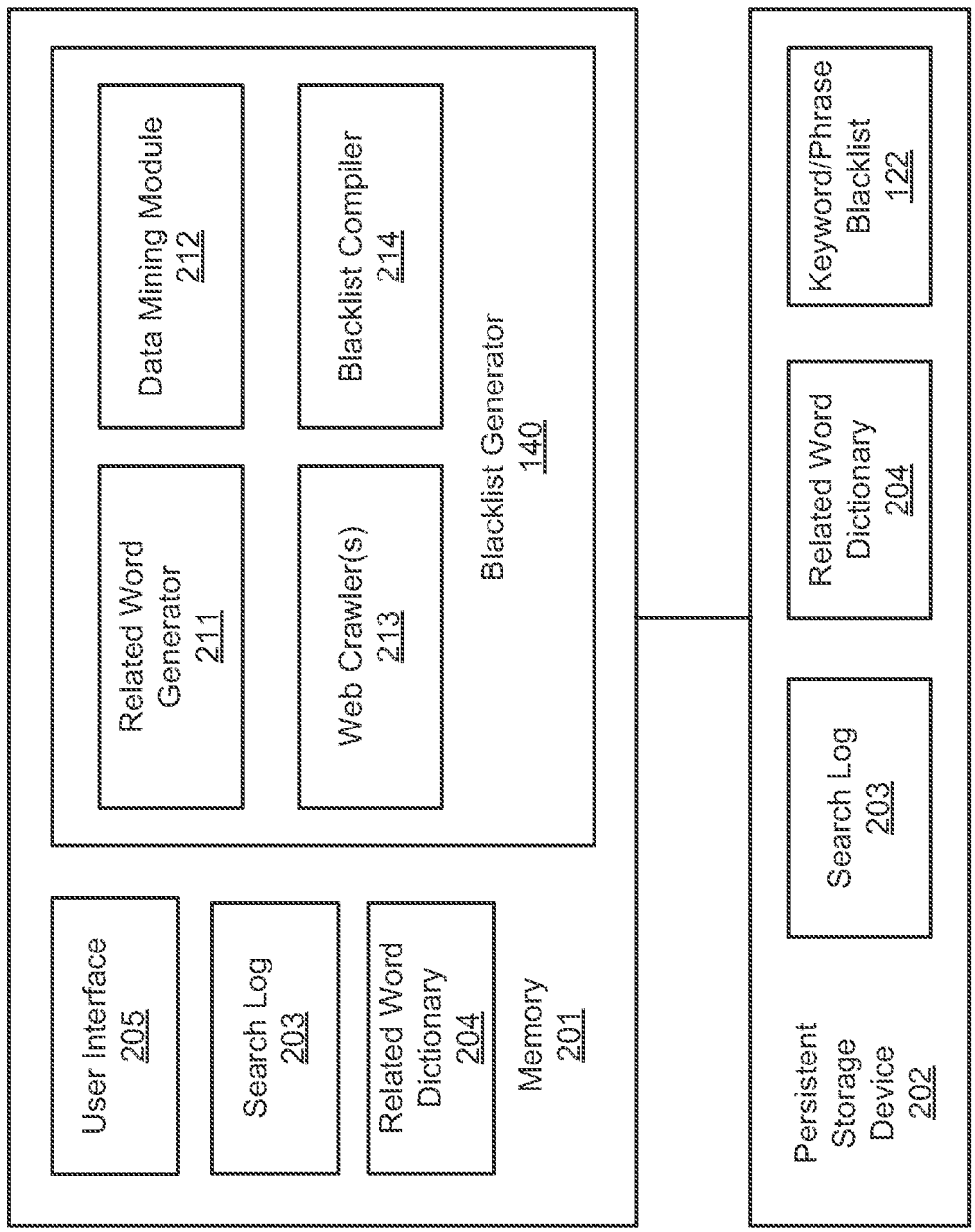
FIG. 2 is a block diagram illustrating an example of a data analytics system according to one embodiment of the invention.

FIG. 2 is a block diagram illustrating an example of a data analytics system according to one embodiment of the invention. System 200 may be implemented as part of analytics system 150 of FIGS. 1A-1B. Referring to FIG. 2, blacklist generator 140 includes, but is not limited to, related word generator 211, data mining module 212, one or more Web crawlers 213, and blacklist compiler 214. These modules can be implemented in software, hardware, or a combination thereof. For example, blacklist generator 140 may be installed and stored in persistent storage device 202 (e.g., hard disks), loaded in memory 201, and executed by one or more processors.

In one embodiment, in response to a phrase that has been determined to be related to malicious or unwanted content, for example, received from an administrator via user interface 205, related word generator 211 (also referred to as a related phrase generator) generates one or more related phrases that are related to the phrase received. Based on the known malicious phrase, related word generator 211 may perform a search in related word dictionary 204 to identify a set of one or more related words or phrases. Related word dictionary 204 includes an index mapping a word or phrase to one or more predefined related words or related phrases.

Related word generator 211 may invoke data mining module 212 to perform data mining on a search history such as search log 203 to determine a set of related words or phrases. For example, data mining module 212 scans search log 203 to determine any search terms or phrase that resulted in known malicious or unwanted content provided by a known malicious content provider. Such terms or phrases may be a good candidate to be included in phrase blacklist 122.

Related word generator 211 may further invoke Web crawler or crawlers 213 to crawl and access a variety of Web sites, particularly certain known Web sites that provide malicious content. Web crawler 213 may scan the Web sites for words or phrases (e.g., titles, description) in view of the content provided by the Web sites. Some of the words or phrases may be considered as candidates for blacklist. Web crawler 213 may further access certain online discussion forums or social communities to examine the content of the discussion or posts. Some of the words or phrases may be considered as blacklist candidates based on the content of the discussion or posts. For example, if some users post some messages complaining about certain malicious content provided by malicious content providers, certain words or phrases of the posts may be considered as candidates for blacklist. In addition, the Web sites referenced in the posts may also be accessed to obtain additional words or phrases. Crawlers 213 may further crawl offline databases, such as non-search logs or codified information (e.g. law books, government regulations) that identify phrases that should be blacklisted. The related word generator may also obtain phrases from intranet websites or databases that contain information regarding best practices or guidelines pertaining to taboo or forbidden phrases or content of questionable legality. The term "crawler" is not limited to software that only indexes web or database content, but any piece of software or hardware module or system that systematically locates and organizes information in a procedural and deterministic manner.

According to another embodiment, related word generator 211 may further communicate with other systems, for example, via an application programming interface (API) or using certain communication protocols over a network, to obtain additional words or phrases. For example, an administrator of a social media site may warn that certain content being searched by end users may be malicious or inappropriate content. If an action has been taken against such a post (e.g., a moderator wanted the poster or deleted the post), it is a signal that this may be an illegal or inappropriate topic. The content of the discussion can be scanned to obtain certain words or phrases for blacklist candidates.

According to one embodiment, in determining related words or phrases, a scoring metric is utilized to calculate a similarity score between a known word or phrase to be added to the blacklist and a newly discovered related word or phrase. The similarity score represents a degree of the similarity or relationship between a known word/phrase and a related word/phrase. If the similarity score is above a predetermined threshold, the discovered related word or phrase is added to the blacklist. According to a further embodiment, certain parameters of related word generator 211 may be adjusted, such that the threshold of what is considered to be a blacklisted word can be adjusted (e.g., having a whitelist such as whitelist 123 or allowing less taboo or semi-legal subjects to still trigger searching of content items based on other metrics such as maximizing revenue, content displayed, etc.)

According to another embodiment, a blacklist may be maintained for each of users or group of users that have performed a search in the past. A user may be represented by a device identifier (ID) of a user device that initiate a search query, as well as other identifying information concerning the user (e.g., name, cookie, location, or network address). The rationale behind it is that each user may behave differently in terms of searching. The individual blacklist may be generated based on a searching or browsing history associated with a user, posts or comments provided by the user on social communities, etc. An individual blacklist can be utilized to block phrases for each user based on each user's risk profile, such as age, gender, location, search/browsing history, social network data, publicly available government data, etc. For example, an individual blacklist can be used to show certain content/ads to teenagers but not to child molesters. Based on all of the related words or phrases generated by related word generator 211, blacklist compiler compiles phrase blacklist 122.

Figure 3:
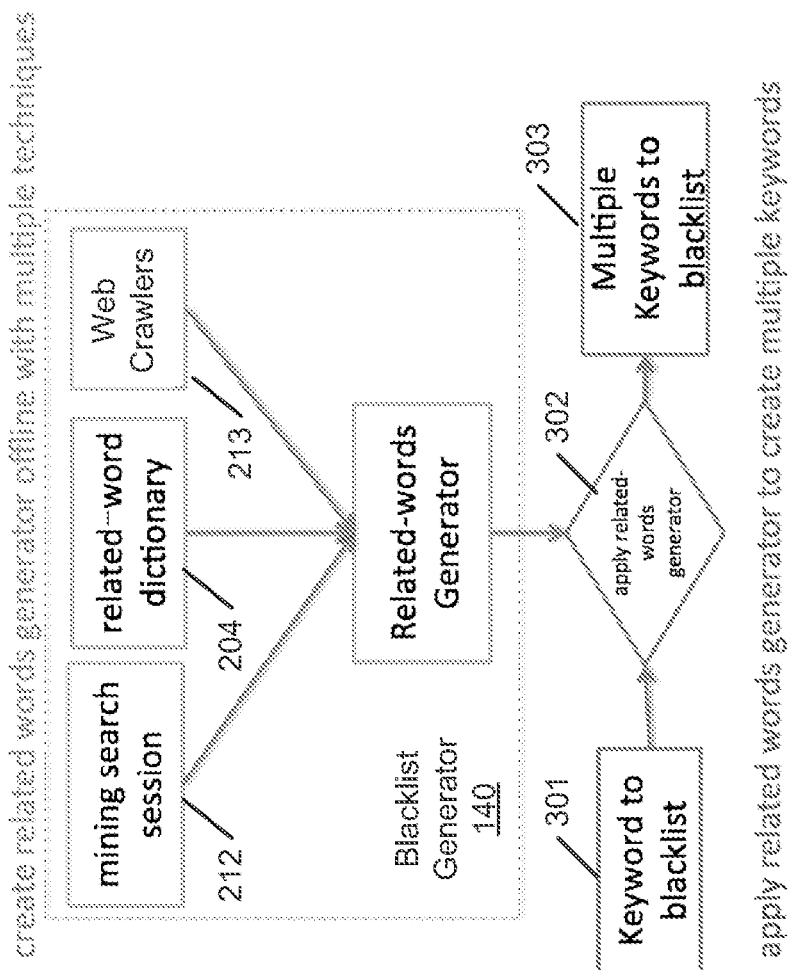
FIG. 3 is a diagram illustrating a processing flow of generating related blacklist words according to one embodiment of the invention.

FIG. 3 is a diagram illustrating a processing flow of generating related blacklist words according to one embodiment of the invention. Referring to FIG. 3, in response to keyword 301 to be added to a blacklist, related word generator 211 of blacklist generator 140 performs various operations as described above to obtain additional related words or phrases, including mining a search log 212, lookup in a related word dictionary 204, and crawling Web sites 213. The related words or phrases are then applied at block 302 to generate multiple words to the blacklist at block 303.

Figure 4:
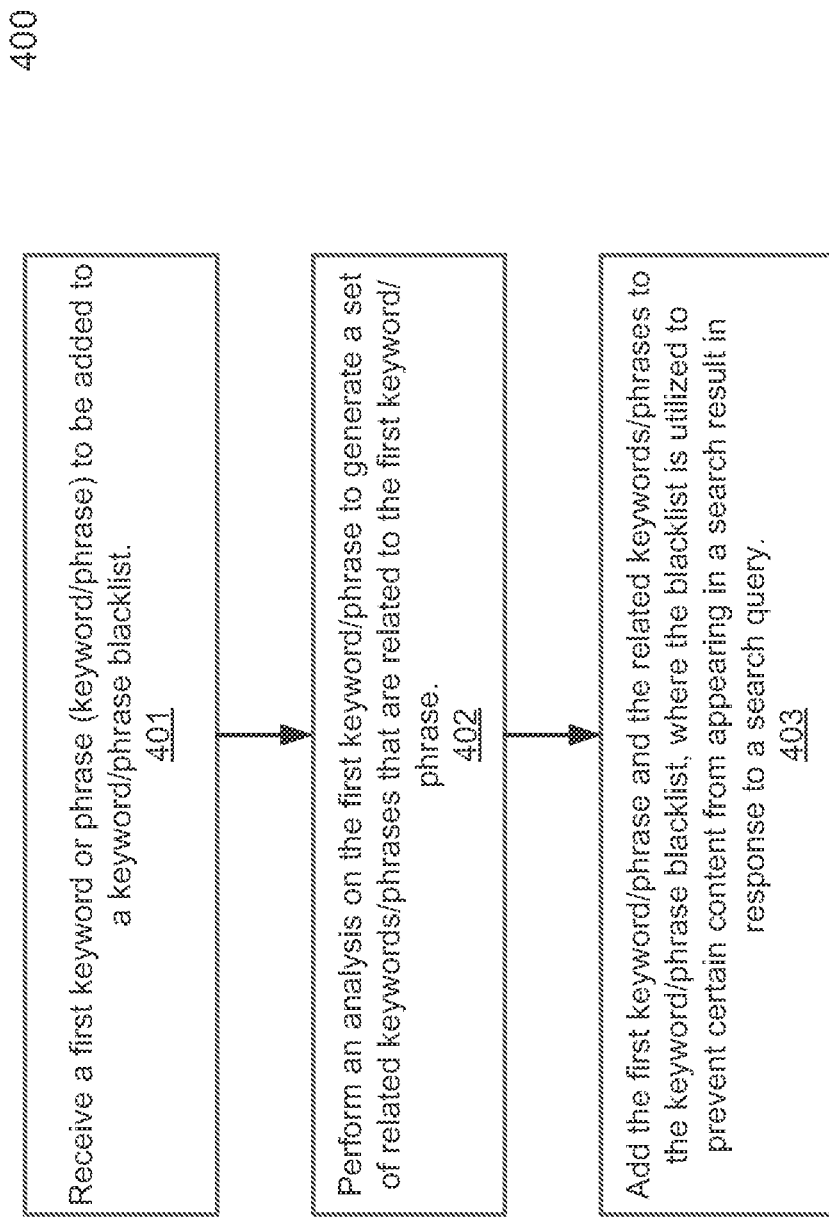
FIG. 4 is a flow diagram illustrating a process of generating a blacklist for blocking malicious content according to one embodiment of the invention.

FIG. 4 is a flow diagram illustrating a process of generating a blacklist for blocking malicious content according to one embodiment of the invention. Process 400 may be performed by processing logic which may include software, hardware, or a combination thereof. For example, process 400 may be performed by blacklist generator 140 of FIG. 2. Referring to FIG. 4, at block 401, processing logic receives a first keyword or phrase to be added to a blacklist. At block 402, processing logic performs an analysis on the first keyword/phrase to generate a set of related keywords/phrases that are related to the first keyword/phrase (e.g., using related word dictionary, crawling Web sites, accessing social communities). At block 403, the first keyword/phrase and the related keywords/phrases are added to the blacklist. The blacklist is subsequently utilized to prevent certain content from appearing in a search result in response to a search query.

Figure 5:
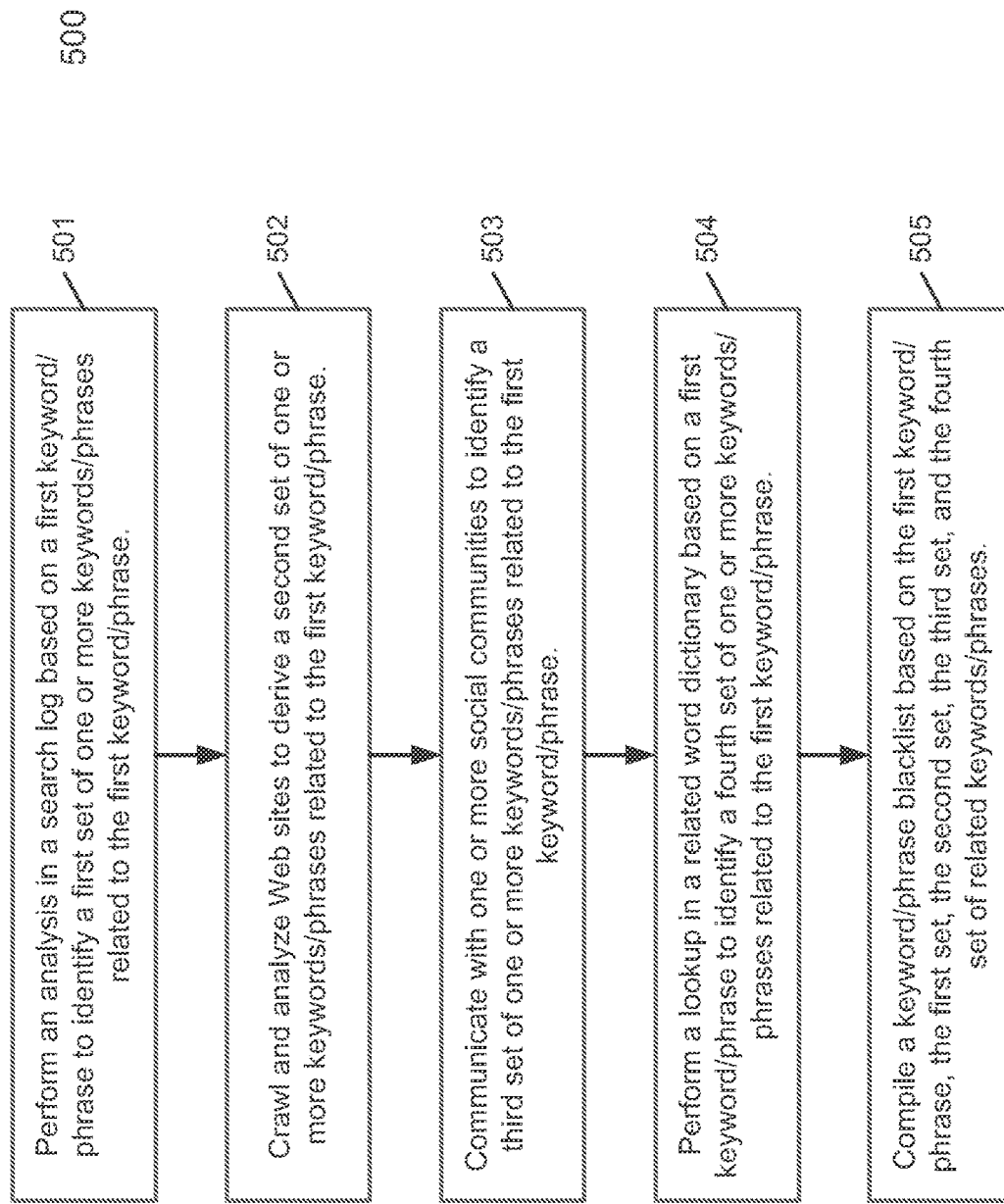
FIG. 5 is a flow diagram illustrating a process of identifying related words or phrases of a blacklist for blocking malicious content according to one embodiment of the invention.

FIG. 5 is a flow diagram illustrating a process of identifying related words or phrases of a blacklist for blocking malicious content according to one embodiment of the invention. Process 500 may be performed by processing logic which may include software, hardware, or a combination thereof. For example, process 500 may be performed by blacklist generator 140 of FIG. 2. Process 500 may be performed as part of operations involved at block 402 of FIG. 4. Referring to FIG. 5, at block 501, in response to a first keyword or phrase to be added to a keyword/phrase blacklist, processing logic performs a first analysis on a search history or search log based on the first keyword/phrase to identify a first set of one or more keywords/phrases that are related to the first keyword/phrase.

At block 502, processing logic invokes one or more Web crawlers to crawl a number of Web sites to identify a second set of one or more keywords/phrases that are related to the first keyword/phrase. At block 503, processing logic communicates with one or more social communities to identify a third set of one or more keywords/phrases that are related to the first keyword/phrase. At block 504, processing logic performs a lookup operation in a predetermined related word dictionary to identify a fourth set of one or more keywords/phrases that are related to the first keyword/phrase. At block 505, processing logic compiles a keyword/phrase blacklist based on the first set, the second set, the third set, and the fourth set of keywords/phrases.

Figure 6:
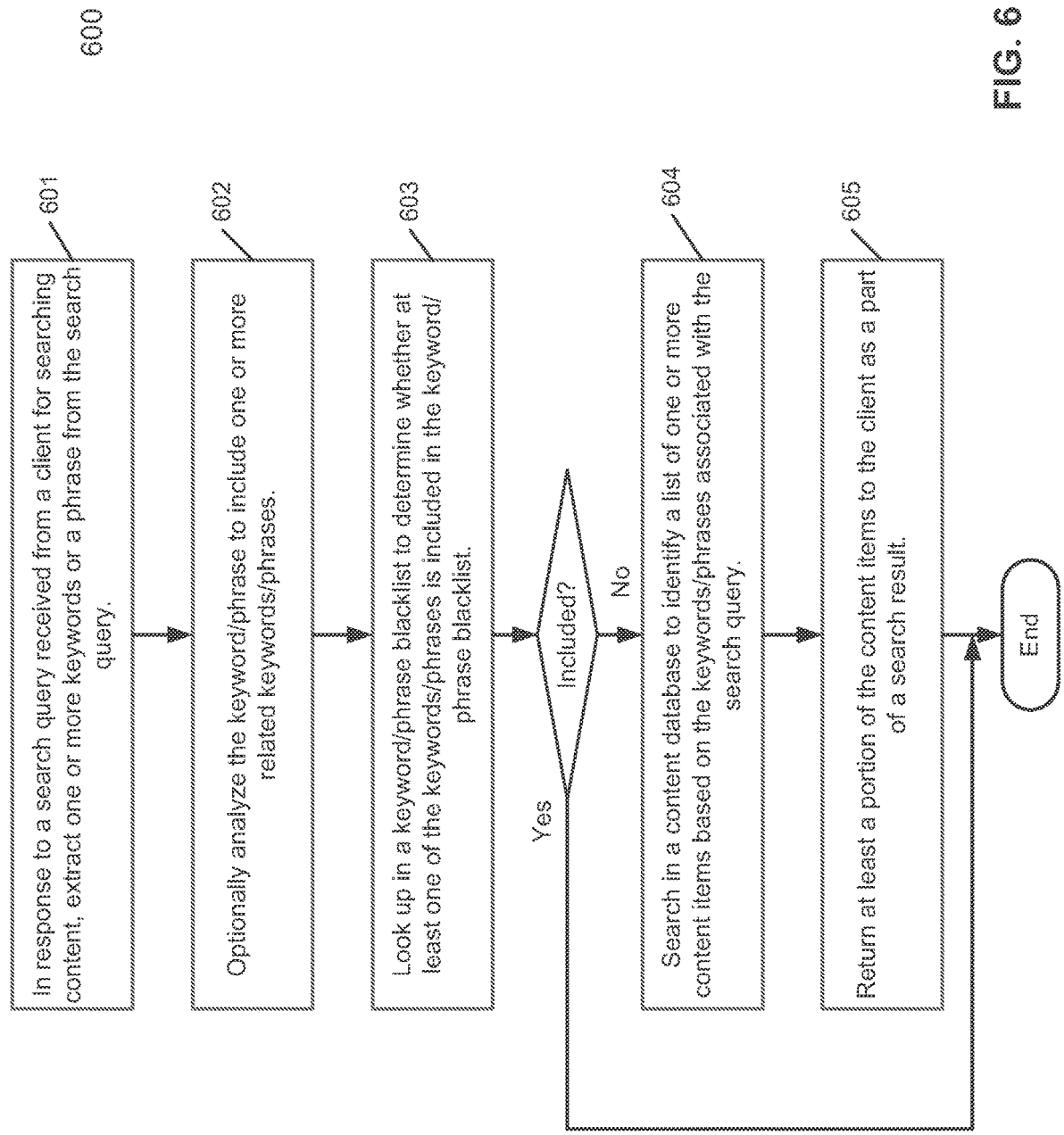
FIG. 6 is a flow diagram illustrating a process of searching content using a blacklist for blocking unwanted content according to one embodiment of the invention.

FIG. 6 is a flow diagram illustrating a process of searching content using a blacklist for blocking unwanted content according to one embodiment of the invention. Process 600 may be performed by processing logic which may include software, hardware, or a combination thereof. For example, process 600 may be performed by server 104 of FIGS. 1A and 1B. Referring to FIG. 6, at block 601, in response to a search query received from a client for searching content, processing logic extracts one or more keywords or a phrase from the search query. At block 602, processing logic may expand the keywords or phrase to obtain additional similar or related keywords or phrases, for example, via an analysis such as a latent semantic analysis. At block 603, processing logic looks up in a keyword/phrase blacklist to determine whether the blacklist includes at least one of the keywords/phrases associated with the search query. If not, at block 604, processing logic searches in a content database based on the keywords associated with the search query to identify and retrieve a list of content items. At block 605, at least a portion of the content items is returned to the client as a part of a search result.

The techniques described above can be applied to searching or matching sponsored content. One type of the sponsored content is advertisement (Ad). For example, referring back to FIGS. 1A-1B, content databases (DB) or servers 130-131 may be an Ad database or as part of an Ad server. Each of the content items, e.g., Ads, is associated with a list of predefined keywords, terms, phrases, or sentences. These predefined keywords, terms, phrases, or sentences may be bidwords purchased, defined or specified by an advertiser. In another embodiment, primary content DB 130 may store the general content generally available in a public network. Auxiliary content DB 131 may be an Ad DB. Server 104 may be a Web server for searching content or alternatively, server 104 may be an Ad server.

Figure 7:
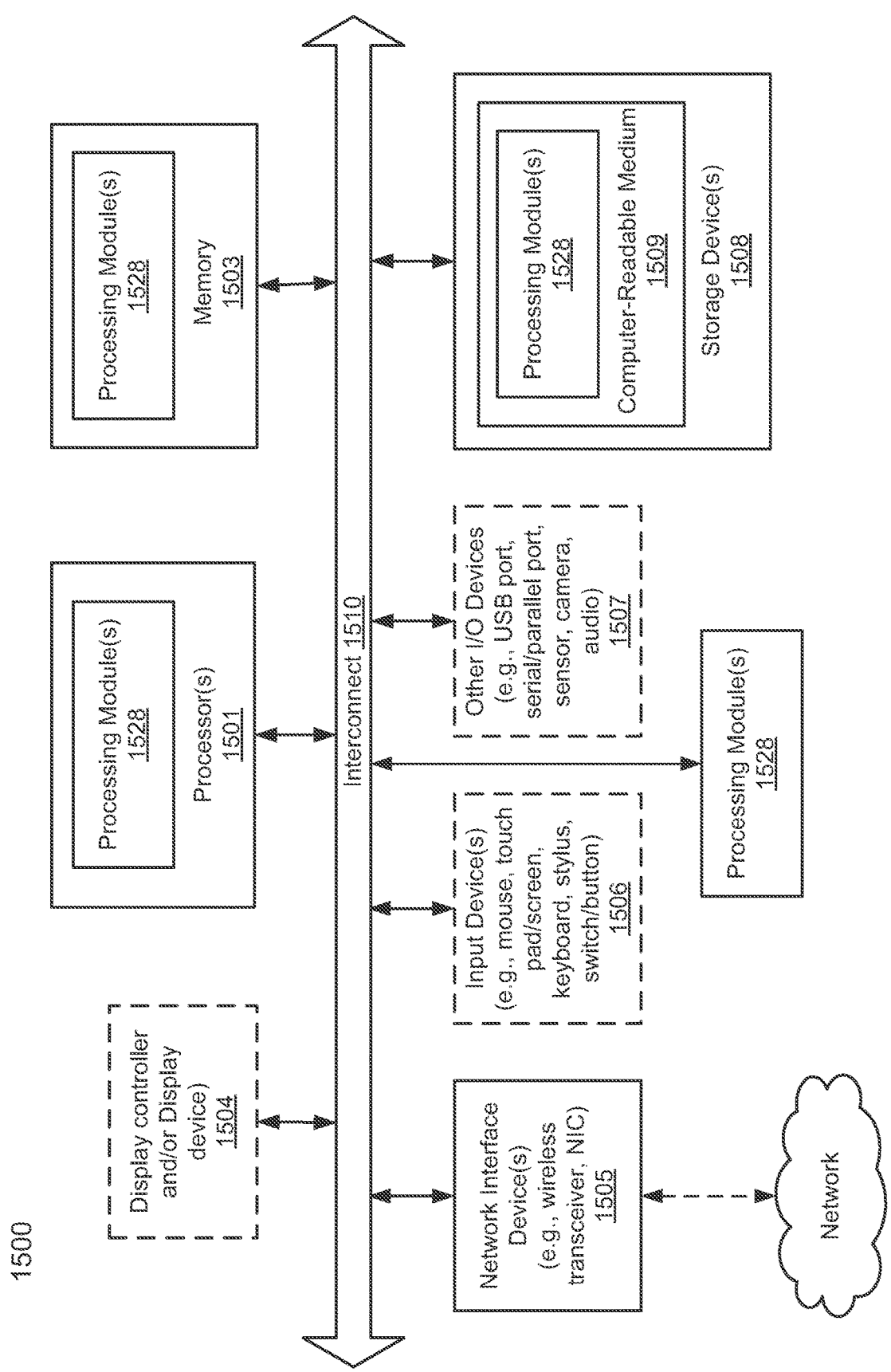
FIG. 7 is a block diagram illustrating a data processing system according to one embodiment.

FIG. 7 is a block diagram illustrating an example of a data processing system which may be used with one embodiment of the invention. For example, system 1500 may represents any of data processing systems described above performing any of the processes or methods described above, such as, for example, a client device or a server described above, such as, for example, clients 101-102, server 104, content server 133, data analytics system or sever 150, as described above.

System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, a search engine or a blacklist generator, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method performed by an electronic device for searching content, the method comprising:
   receiving a first phrase having one or more keywords, the first phrase having been determined to be related to at least one unwanted content item;
   performing an analysis on the keywords of the first phrase to identify a set of phrases that are related to the first phrase;
   generating a phrase blacklist that includes the first phrase and the set of phrases,
      wherein the phrase blacklist is utilized to prevent one or more unwanted content items from appearing in a search result, in response to a search query having a phrase matching at least one of the phrases in the phrase blacklist,
   wherein performing an analysis on the keywords of the first phrase comprises:
      accessing a third-party online forum or a third-party online social community,
      performing a contextual analysis of textual content of a first post by a member of the third-party online forum or of the third-party online social community regarding an unwanted content item by determining whether the textual content of the first post has a warning provided by the member about the unwanted content item being malicious or inappropriate content, and, in response to determining that the textual content of the first post has the warning, identifying at least one related phrase that is contained within the textual content of the first post for inclusion in the phrase blacklist, and
      performing a lookup operation in a related word dictionary based on one or more keywords associated with the first phrase to identify a set of one or more phrases that are related to the first phrase, wherein the related word dictionary contains mapping information that maps one or more keywords to one or more related keywords;
   determining whether an administrator of the third-party online forum or the third-party online social community has deleted a second post on the third-party online forum or the third party online social community;
   in response to determining that the administrator has deleted the second post,
      performing the contextual analysis of the second post to identify at least one additional phrase that is related to the first phrase that is contained within the second post; and
      including the additional phrase in the phrase blacklist.

2. The method of claim 1, further comprising:
   in response to a first search query from a client, performing an analysis on the first search query to derive a second phrase;
   performing a lookup operation in the phrase blacklist to determine whether the phrase blacklist includes the second phrase;
   searching in a content database based on one or more keywords associated with the first search query to identify a list of one or more content items, in response to determining that the phrase blacklist does not contain the second phrase; and
   transmitting a search result having at least a portion of the content items to the client.

3. The method of claim 2, further comprising ignoring the first search query without searching in the content database, in response to determining that the phrase blacklist contains the second phrase.

4. The method of claim 1, wherein the set of one or more phrases is a first set of one or more phrases, wherein performing an analysis on the keywords of the first phrase comprises performing an analysis on a search log based on one or more keywords associated with the first phrase to identify a first second set of one or more phrases that are related to the first phrase, wherein the search log records a history of search events that were captured over a period of time.

5. The method of claim 4, wherein performing an analysis on the keywords of the first phrase further comprises crawling a plurality of Web sites or databases based on one or more keywords associated with the first phrase to identify a third set of one or more phrases that are related to the first phrase.

6. A non-transitory machine-readable medium having instructions stored therein, which when executed by a processor, cause the processor to perform operations, the operations comprising:
   receiving a first phrase having one or more keywords, the first phrase having been determined to be related to at least one unwanted content item;
   performing an analysis on the keywords of the first phrase to identify a set of phrases that are related to the first phrase;
   generating a phrase blacklist that includes the first phrase and the set of phrases,
      wherein the phrase blacklist is utilized to prevent one or more unwanted content items from appearing in a search result, in response to a search query having a phrase matching at least one of the phrases in the phrase blacklist,
   wherein performing an analysis on the keywords of the first phrase comprises:
      accessing a third-party online forum or a third-party online social community,
      performing a contextual analysis of textual content of a first post by a member of the third-party online forum or of the third-party social community regarding an unwanted content item by determining whether the textual content of the first post has a warning provided by the member about the unwanted content item being malicious or inappropriate content, and, in response to determining that the textual content of the first post has the warning, identifying at least one related phrase that is contained within the textual content of the first post for inclusion in the phrase blacklist, and performing a lookup operation in a related word dictionary based on one or more keywords associated with the first phrase to identify a set of one or more phrases that are related to the first phrase, wherein the related word dictionary contains mapping information that maps one or more keywords to one or more related keywords;

determining whether an administrator of the third-party online form or the third-party online social community has deleted a second post on the third-party online forum or the third party online social community;

in response to determining that the administrator has deleted the second post, performing the contextual analysis of the second post to identify at least one additional phrase that is related to the first phrase that is contained within the second post; and including the additional phrase in the phrase blacklist.

7. The machine-readable medium of claim 6, wherein the operations further comprise:

in response to a first search query from a client, performing an analysis on the first search query to derive a second phrase;

performing a lookup operation in the phrase blacklist to determine whether the phrase blacklist includes the second phrase;

searching in a content database based on one or more keywords associated with the first search query to identify a list of one or more content items, in response to determining that the phrase blacklist does not contain the second phrase; and transmitting a search result having at least a portion of the content items to the client.

8. The machine-readable medium of claim 7, wherein the operations further comprise ignoring the first search query without searching in the content database, in response to determining that the phrase blacklist contains the second phrase.

9. The machine-readable medium of claim 6, wherein the set of one or more phrases is a first set of one or more phrases, wherein performing an analysis on the keywords of the first phrase comprises performing an analysis on a search log based on one or more keywords associated with the first phrase to identify a second set of one or more phrases that are related to the first phrase, wherein the search log records a history of search events that were captured over a period of time.

10. The machine-readable medium of claim 9, wherein performing an analysis on the keywords of the first phrase further comprises crawling a plurality of Web sites or databases based on one or more keywords associated with the first phrase to identify a third set of one or more phrases that are related to the first phrase.

11. A data processing system, comprising:

a processor; and a memory coupled to the processor to store instructions, which when executed by the processor, cause the processor to perform operations, the operations including, receiving a first phrase having one or more keywords, the first phrase having been determined to be related to at least one unwanted content item, performing an analysis on the keywords of the first phrase to identify a set phrases that are related to the first phrase, generating a phrase blacklist that includes the first phrase and the set of phrases, wherein the phrase blacklist is utilized to prevent one or more unwanted content items from appearing in a search result, in response to a search query having a phrase matching at least one of the phrases in the phrase blacklist, wherein performing an analysis on the keywords of the first phrase comprises:

accessing a third-party online forum or a third-party online social community, performing a contextual analysis of textual content of a first post by a member of the third-party online forum or of the third-party social community regarding an unwanted content item by determining whether the textual content of the first post has a warning provided by the member about the unwanted content item being malicious or inappropriate content, and in response to determining that the textual content of the first post has the warning, identifying at least one related phrase that is contained within the textual content of the first post for inclusion in the phrase blacklist, and performing a lookup operation in a related word dictionary based on one or more keywords associated with the first phrase to identify a set of one or more phrases that are related to the first phrase, wherein the related word dictionary contains mapping information that maps one or more keywords to one or more related keywords;

determining whether an administrator of the third-party online form or the third-party online social community has deleted a second post on the third-party online forum or the third party online social community;

in response to determining that the administrator has deleted the second post, performing the contextual analysis of the second post to identify at least one additional phrase that is related to the first phrase that is contained within the second post; and including the additional phrase in the phrase blacklist.

12. The system of claim 11, wherein the operations further comprise:

in response to a first search query from a client, performing an analysis on the first search query to derive a second phrase;

performing a lookup operation in the phrase blacklist to determine whether the phrase blacklist includes the second phrase;

searching in a content database based on one or more keywords associated with the first search query to identify a list of one or more content items, in response to determining that the phrase blacklist does not contain the second phrase; and transmitting a search result having at least a portion of the content items to the client.

13. The system of claim 12, wherein the operations further comprise ignoring the first search query without searching in the content database, in response to determining that the phrase blacklist contains the second phrase.

14. The system of claim 11, wherein the set of one or more phrases is a first set of one or more phrases, wherein performing an analysis on the keywords of the first phrase comprises performing an analysis on a search log based on one or more keywords associated with the first phrase to identify a second set of one or more phrases that are related to the first phrase, wherein the search log records a history of search events that were captured over a period of time.

15. The system of claim 14, wherein performing an analysis on the keywords of the first phrase further comprises crawling a plurality of Web sites or databases based on one or more keywords associated with the first phrase to identify a third set of one or more phrases that are related to the first phrase.

* * * * *